United States Patent
Al-Saeedi

(10) Patent No.: US 12,508,330 B1
(45) Date of Patent: Dec. 30, 2025

(54) RADIOPHARMACEUTICALS INCLUDING ENCAPSULATED GA+$^{99m}$Tc

(71) Applicant: KUWAIT UNIVERSITY, Safat (KW)

(72) Inventor: Fatma Jassab Faleh Al-Saeedi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/931,596

(22) Filed: Oct. 30, 2024

(51) Int. Cl.
*A61K 51/12* (2006.01)
*A61K 36/484* (2006.01)
*A61K 51/04* (2006.01)
*A61P 1/16* (2006.01)
*A61P 31/14* (2006.01)

(52) U.S. Cl.
CPC ........ *A61K 51/1268* (2013.01); *A61K 36/484* (2013.01); *A61K 51/0491* (2013.01); *A61P 1/16* (2018.01); *A61P 31/14* (2018.01); *A61K 2121/00* (2013.01)

(58) Field of Classification Search
CPC .............. A61K 51/1268; A61K 36/484; A61K 51/0491; A61P 1/16; A61P 31/14
USPC ....................................... 424/1.73
See application file for complete search history.

(56) References Cited

PUBLICATIONS

Tian et al. Biomat. 31 (2010) 4748-4756. (Year: 2010).*
Zeng et al. Chin. Sci. Bull. 1987, 24, 751-755. (Year: 1987).*
Jallinoja Dissertation—Vanderbilt University 2022, 1-144. (Year: 2022).*
Salmanoglu, et al, "Currently Available Radiopharmaceuticals for Imaging Infection and the Holy Grail"; Semin Nucl Med. Author manuscript; available in PMC Apr. 29, 2019. Published in final edited form as: Semin Nucl Med. Mar. 2018; 48(2): 86-99. doi: 10.1053/j.semnuclmed.2017.10.003.
Chaurasiya, et al, "Supramolecule-Mediated Delivery of Phytochemicals"; (eds) Nanotechnology Based Delivery of Phytoconstituents and Cosmeceuticals. Springer, Singapore. https://doi.org/10.1007/978-981-99-5314-1_6, Published, Jan. 11, 2024.
Bencheikh, et al, "Inventory of Medicinal Plants Used Traditionally to Manage Kidney Diseases in North-Eastern Morocco: Ethnobotanical Fieldwork and Pharmacological Evidence"; Plants (Basel). Sep. 2021; 10(9): 1966. Published online Sep. 20, 2021. doi: 10.3390/plants10091966.
Vosough, et al, "Effect of Saffron (*Crocus sativus*) Administration on Kidney Function in Normal Cats as Determined by Use of 99mTc-DTPA Renal Scintigraphy"; Iranian Journal of Veterinary Surgery (IJVS), vol. 09, Issue 2—Serial No. 21, Dec. 2014, pp. 45-50.
Jones, et al, "Broad-Spectrum Extracellular Antiviral Properties of Cucurbit[n]urils"; ACS Infect Dis. Oct. 14, 2022;8(10):2084-2095. doi: 10.1021/acsinfecdis.2c00186. Epub Sep. 5, 2022.
Strebl, et al, "Adamantane/Cucurbituril: A Potential Pretargeted Imaging Strategy in Immuno-PET"; Mol Imaging. Jan.-Dec. 2018; 17: 1536012118799838. Published online Oct. 25, 2018. doi: 10.1177/1536012118799838.
Van De Sand, et al, "Glycyrrhizin Effectively Inhibits SARS-COV-2 Replication by Inhibiting the Viral Main Protease"; Viruses. Apr. 2021; 13(4): 609. Published online Apr. 2, 2021. doi: 10.3390/v13040609.
Kwong, et al, "Reviving chloroquine for anti-SARS-COV-2 treatment with cucurbit[7]uril-based supramolecular formulation"; Chin Chem Lett. Oct. 2021; 32(10): 3019-3022. Published online Apr. 3, 2021. doi: 10.1016/j.cclet.2021.04.008.
Kaur Ph.D, et al, "Technetium-99m labeled core shell hyaluronate nanoparticles as tumor responsive, metastatic skeletal lesion targeted combinatorial theranostics"; Carbohydrate Polymers vol. 312, Jul. 15, 2023, 120840.
Goel, et al, "Recognition-mediated Cucurbit[7]uril-Heptamolybdate Hybrid Material: A Facile Supramolecular Strategy for 99mTc Separation"; May 2016Chemical Communications 52(45) DOI:10.1039/C6CC02613C.

* cited by examiner

*Primary Examiner* — Michael G. Hartley
*Assistant Examiner* — Sean R Donohue
(74) *Attorney, Agent, or Firm* — Nath, Goldberg & Meyer; Joshua B. Goldberg

(57) ABSTRACT

A $^{99m}$Tc labeled CB7-GA complex, its synthesis, and its use as an anti-viral and anti-liver disease agent.

19 Claims, 4 Drawing Sheets

FIG. 8

RADIOPHARMACEUTICALS INCLUDING ENCAPSULATED GA+$^{99m}$Tc

1. FIELD

The present disclosure relates to radiopharmaceuticals including encapsulated glycyrrhizic acid (GA) GA+$^{99m}$Tc, its synthesis, and its use as an anti-microbial agent.

2. DESCRIPTION OF THE RELATED ART

There remains an ongoing need for new therapeutically active agents for treating a variety of diseases, disorders, and conditions including, but not limited to, microbial infections, and the like.

Glycyrrhizic acid (GA) is a natural compound extracted from the licorice plant. It has shown promising potential for treating various diseases, such as viral infections and liver diseases.

Thus, new molecules having desired therapeutic activities and solving the aforementioned problems are desired.

SUMMARY

The present subject matter relates to a radiopharmaceutical including glycyrrhizic acid (GA). The radiopharmaceutical can include a glycyrrhizic acid (GA) encapsulated in a macrocyclic molecule and labeled with $^{99m}$Technetium ($^{99m}$Tc) (herein, $^{99m}$Tc labeled CB7-GA complex). $^{99m}$Tc is a radioactive compound that can be used to tag GA. The GA radiopharmaceutical can be used for diagnosis, therapy, and theragnostics (combination of diagnosis and therapy) o. In an embodiment, the GA radiopharmaceutical can be used for experimental medical imaging.

In an embodiment the macrocylic molecule is cucurbit[7] uril (CB7). Cucurbit[7]uril(CB7) is a macrocyclic molecule known for its ability to form host-guest complexes with various drug molecules. Encapsulation with CB7 can enhance the solubility, stability, and bioavailability of GA.

In an embodiment, the present subject matter relates to a GA radiopharmaceutical including an encapsulated GA labeled with $^{99m}$Technetium, wherein the GA is encapsulated in a cavity of a cucurbit [7]uril macrocycle (CB7).

In another embodiment, the present subject matter relates to a pharmaceutically acceptable composition comprising a therapeutically effective amount of a radiopharmaceutical including a $^{99m}$Tc labeled CB7-GA Complex (CB7-GA Complex-$^{99m}$Tc) and a pharmaceutically acceptable carrier.

In a further embodiment, the present subject matter relates to a method of treating liver disease in a patient comprising administering to a patient in need thereof a therapeutically effective amount of the $^{99m}$Tc labeled CB7-GA complex.

In a further embodiment, the present subject matter relates to a method of treating viruses in a patient comprising administering to a patient in need thereof a therapeutically effective amount of the $^{99m}$Tc labeled CB7-GA complex.

In one more embodiment, the present subject matter relates to a method of making the $^{99m}$Tc labeled CB7-GA Complex (or CB7-GA Complex-$^{99m}$Tc), the method includes: mixing cucurbit[7]uril (CB7) and glycyrrhizic acid (GA) to obtain a CB7-GA complex; dissolving glycyrrhizic acid (GA) in distilled saline to form a reaction mixture; adding a reducing agent to the reaction mixture to obtain a prepared GA; labeling the prepared GA by adding sodium pertechnatetate (Na99m TcO$_4$) to the prepared GA; and obtaining the 99mTc labeled CB7 encapsulated GA.

These and other features of the present subject matter will become readily apparent upon further review of the following specification.

BRIEF DESCRIPTION OF DRAWINGS

FIG. 8 shows a graph showing the effect of a CB7-GA complex with $^{99m}$Tc on Covid-19.

DETAILED DESCRIPTION OF THE PREFERRED EMBODIMENTS

Figure 1:
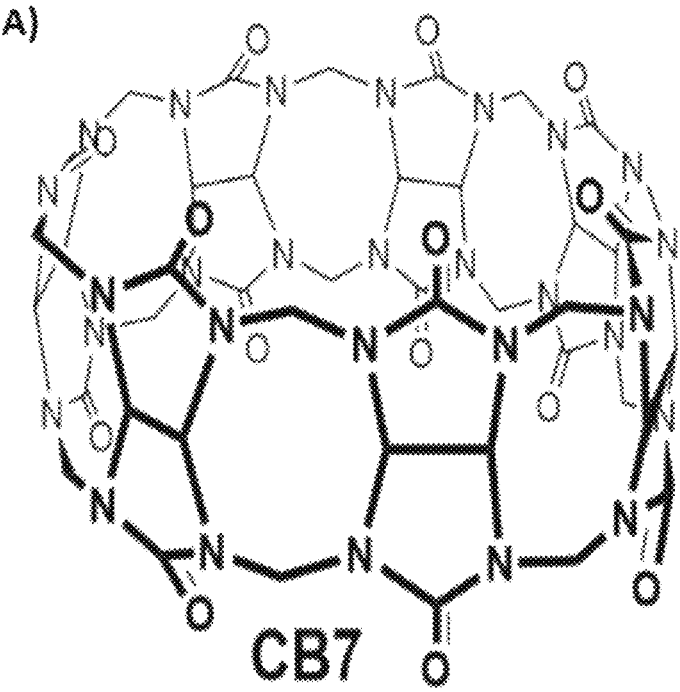
FIG. 1 shows an implementation of a CB7 molecule.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment of a condition, disorder, or disease, such as cancer.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 2:
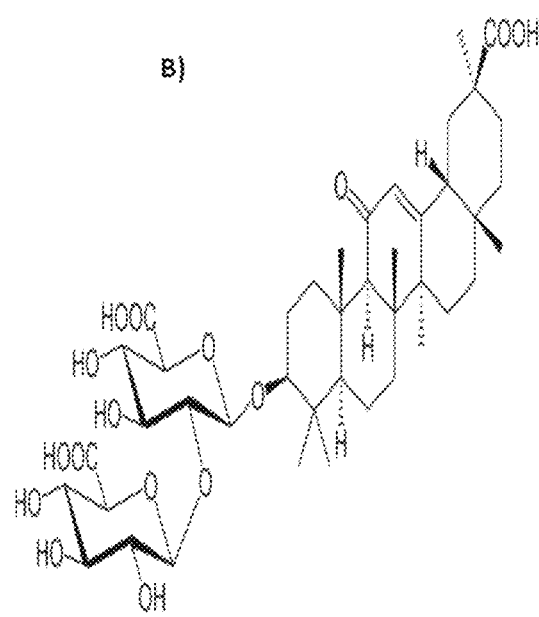
FIG. 2 shows an implementation of glycyrrhizic acid.
Figure 3:
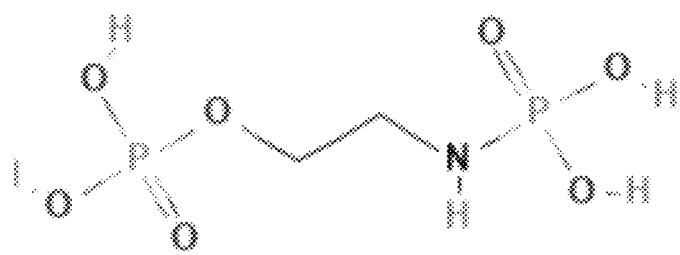
FIG. 3 shows an implementation of $^{99m}$Tc.

The present subject matter relates to a GA radiopharmaceutical including a 99mTechnetium ($^{99m}Tc$) (FIG. 3) labeled cucurbit [7]uril macrocycle (CB7) (FIG. 1) encapsulated Glycyrrhizic acid (GA) (FIG. 2) (CB7-GA Complex-$^{99m}Tc$).

Glycyrrhizic acid (GA) is a natural compound extracted from the licorice plant. It has shown promising potential for treating various diseases, such as viral infections and liver diseases. $^{99m}$Technetium ($^{99m}Tc$) is a radioactive compound that can tag GA. It can be used for diagnosis, therapy, and theranostics (combination of diagnosis and therapy). As described herein, a CB7-GA Complex-$^{99m}Tc$ can be created by encapsulating GA with a cucurbit [7]uril (CB7) macrocycle, then labeling the encapsulated GA with $^{99m}Tc$. This complex can be used in experimental and medical imaging.

Technetium is a versatile element that has many unique properties. It is a radioactive chemical element with the symbol Tc and atomic number 43. It is the lightest element whose isotopes are all radioactive, and it is only produced synthetically. Technetium can form different compounds with various oxidation states, and can exist in all oxidation states from −1 to +7. Technetium-99m is a significant isotope because it emits gamma rays and has a short half-life (6 hours), making it useful in nuclear medicine for diagnosing many diseases of different organs, such as cancer, and other conditions.

Cucurbit[7]uril(CB7) is a macrocyclic molecule known for its ability to form host-guest complexes with various drug molecules. This encapsulation can enhance the solubility, stability, and bioavailability of drugs.

The present subject matter relates to preparing a radiopharmaceutical comprising chemically modifying glycyrrhizic acid (GA) extracted from the licorice (*Glycyrrhiza glabra*) plant. The GA is modified via non-covalent complexation to cucurbit [7]urilmacrocycle's cavity(CB7). The encapsulation by the CB7 macrocycle increases the antiviral efficacy of GA in many viruses especially COVID-19. The encapsulated GA can be labeled with $^{99m}Tc$ to provide the radiopharmaceutical (encapsulated GA+$^{99m}$Tc).

The present subject matter relates to a radiopharmaceutical, comprising a $^{99m}$Tc labeled CB7-GA complex, the $^{99m}$Tc labeled CB7-GA complex including: encapsulated glycyrrhizic acid (GA); wherein the GA is encapsulated in a cavity of cucurbit [7]uril macrocycle (CB7); and the encapsulated GA is labeled with $^{99m}$Technetium ($^{99m}$Tc).

In some embodiments, the GA may be derived from a licorice plant.

In further embodiments, the $^{99m}$Tc labeled CB7-GA complex may stable for up to 3 hours.

In another embodiment, the present subject matter relates to a pharmaceutically acceptable composition comprising a therapeutically effective amount of the $^{99m}$Tc labeled CB7-GA complex and a pharmaceutically acceptable carrier.

In this regard, the present subject matter is further directed to pharmaceutical compositions comprising a therapeutically effective amount of the complex as described herein together with one or more pharmaceutically acceptable carriers, excipients, or vehicles. In some embodiments, the present compositions can be used for combination therapy, where other therapeutic and/or prophylactic ingredients can be included therein.

The present subject matter further relates to a pharmaceutical composition which comprises the present complex together with at least one pharmaceutically acceptable auxiliary.

Non-limiting examples of suitable excipients, carriers, or vehicles useful herein include liquids such as water, saline, glycerol, polyethyleneglycol, hyaluronic acid, ethanol, and the like. Suitable excipients for nonliquid formulations are also known to those of skill in the art. A thorough discussion of pharmaceutically acceptable excipients and salts useful herein is available in Remington's Pharmaceutical Sciences, 18th Edition. Easton, Pa., Mack Publishing Company, 1990, the entire contents of which are incorporated by reference herein.

The present complex is typically administered at a therapeutically or pharmaceutically effective dosage, e.g., a dosage sufficient to provide treatment for cancer or a microbial infection. Administration of the complex or pharmaceutical compositions thereof can be by any method that delivers the complex systemically and/or locally. These methods include oral routes, parenteral routes, intraduodenal routes, and the like.

While human dosage levels have yet to be optimized for the present complex, generally, a daily dose is from about 0.01 to 10.0 mg/kg of body weight, for example about 0.1 to 5.0 mg/kg of body weight. The precise effective amount will vary from subject to subject and will depend upon the species, age, the subject's size and health, the nature and extent of the condition being treated, recommendations of the treating physician, and the therapeutics or combination of therapeutics selected for administration. The subject may be administered as many doses as is required to reduce and/or alleviate the signs, symptoms, or causes of the disease or disorder in question, or bring about any other desired alteration of a biological system.

In employing the present complex for treatment of liver disease and microbial infections, any pharmaceutically acceptable mode of administration can be used with other pharmaceutically acceptable excipients, including solid, semi-solid, liquid or aerosol dosage forms, such as, for example, tablets, capsules, powders, liquids, suspensions, suppositories, aerosols or the like. The present complexes can also be administered in sustained or controlled release dosage forms, including depot injections, osmotic pumps, pills, transdermal (including electrotransport) patches, and the like, for the prolonged administration of the complex at a predetermined rate, preferably in unit dosage forms suitable for single administration of precise dosages.

The present complex may also be administered as compositions prepared as foods for humans or animals, including medical foods, functional food, special nutrition foods and dietary supplements. A "medical food" is a product prescribed by a physician that is intended for the specific dietary management of a disorder or health condition for which distinctive nutritional requirements exist and may include formulations fed through a feeding tube (referred to as enteral administration or gavage administration).

A "dietary supplement" shall mean a product that is intended to supplement the human diet and may be provided in the form of a pill, capsule, tablet, or like formulation. By way of non-limiting example, a dietary supplement may include one or more of the following dietary ingredients: vitamins, minerals, herbs, botanicals, amino acids, and dietary substances intended to supplement the diet by increasing total dietary intake, or a concentrate, metabolite, constituent, extract, or combinations of these ingredients, not intended as a conventional food or as the sole item of a meal or diet. Dietary supplements may also be incorporated into foodstuffs, such as functional foods designed to promote control of glucose levels. A "functional food" is an ordinary food that has one or more components or ingredients incorporated into it to give a specific medical or physiological benefit, other than a purely nutritional effect. "Special nutrition food" means ingredients designed for a particular diet related to conditions or to support treatment of nutritional deficiencies.

Generally, depending on the intended mode of administration, the pharmaceutically acceptable composition will contain about 0.1% to 90%, for example about 0.5% to 50%, by weight of the present complex, the remainder being suitable pharmaceutical excipients, carriers, etc.

One manner of administration for the conditions detailed above is oral, using a convenient daily dosage regimen which can be adjusted according to the degree of affliction. For such oral administration, a pharmaceutically acceptable, non-toxic composition is formed by the incorporation of any of the normally employed excipients, such as, for example, mannitol, lactose, starch, magnesium stearate, sodium saccharine, talcum, cellulose, sodium croscarmellose, glucose, gelatin, sucrose, magnesium carbonate, and the like. Such compositions take the form of solutions, suspensions, tablets, dispersible tablets, pills, capsules, powders, sustained release formulations and the like.

The present compositions may take the form of a pill or tablet and thus the composition may contain, along with the active ingredient, a diluent such as lactose, sucrose, dicalcium phosphate, or the like; a lubricant such as magnesium stearate or the like; and a binder such as starch, gum acacia, polyvinyl pyrrolidine, gelatin, cellulose and derivatives thereof, and the like.

Liquid pharmaceutically administrable compositions can, for example, be prepared by dissolving, dispersing, etc. an active complex as defined above and optional pharmaceutical adjuvants in a carrier, such as, for example, water, saline, aqueous dextrose, glycerol, glycols, ethanol, and the like, to thereby form a solution or suspension. If desired, the pharmaceutical composition to be administered may also contain minor amounts of nontoxic auxiliary substances such as wetting agents, emulsifying agents, or solubilizing agents, pH buffering agents and the like, for example, sodium acetate, sodium citrate, cyclodextrin derivatives, sorbitan monolaurate, triethanolamine acetate, triethanolamine oleate, etc.

For oral administration, a pharmaceutically acceptable non-toxic composition may be formed by the incorporation of any normally employed excipients, such as, for example, pharmaceutical grades of mannitol, lactose, starch, magnesium stearate, talcum, cellulose derivatives, sodium croscarmellose, glucose, sucrose, magnesium carbonate, sodium saccharin, talcum and the like. Such compositions take the form of solutions, suspensions, tablets, capsules, powders, sustained release formulations and the like.

For a solid dosage form, a solution or suspension in, for example, propylene carbonate, vegetable oils or triglycerides, may be encapsulated in a gelatin capsule. Such diester solutions, and the preparation and encapsulation thereof, are disclosed in U.S. Pat. Nos. 4,328,245; 4,409,239; and 4,410,545, the contents of each of which are incorporated herein by reference. For a liquid dosage form, the solution, e.g., in a polyethylene glycol, may be diluted with a sufficient quantity of a pharmaceutically acceptable liquid carrier, e.g., water, to be easily measured for administration.

Alternatively, liquid or semi-solid oral formulations may be prepared by dissolving or dispersing the active compound or salt in vegetable oils, glycols, triglycerides, propylene glycol esters (e.g., propylene carbonate) and the like, and encapsulating these solutions or suspensions in hard or soft gelatin capsule shells.

Other useful formulations include those set forth in U.S. Pat. Nos. Re. 28,819 and 4,358,603, the contents of each of which are hereby incorporated by reference.

Another manner of administration is parenteral administration, generally characterized by injection, either subcutaneously, intramuscularly or intravenously. Injectables can be prepared in conventional forms, either as liquid solutions or suspensions, solid forms suitable for solution or suspension in liquid prior to injection, or as emulsions. Suitable excipients are, for example, water, saline, dextrose, glycerol, ethanol or the like. In addition, if desired, the pharmaceutical compositions to be administered may also contain minor amounts of non-toxic auxiliary substances such as wetting or emulsifying agents, pH buffering agents, solubility enhancers, and the like, such as for example, sodium acetate, sorbitan monolaurate, triethanolamine oleate, cyclodextrins, etc.

Another approach for parenteral administration employs the implantation of a slow-release or sustained-release system, such that a constant level of dosage is maintained. The percentage of complex contained in such parenteral compositions is highly dependent on the specific nature thereof, as well as the activity of the complex and the needs of the subject. However, percentages of active ingredient of 0.01% to 10% in solution are employable and will be higher if the composition is a solid which will be subsequently diluted to the above percentages. The composition may comprise 0.2% to 2% of the active agent in solution.

Nasal solutions of the complex alone or in combination with other pharmaceutically acceptable excipients can also be administered.

Formulations of the complex or a salt may also be administered to the respiratory tract as an aerosol or solution for a nebulizer, or as a microfine powder for insufflation, alone or in combination with an inert carrier such as lactose. In such a case, the particles of the formulation have diameters of less than 50 microns, for example less than 10 microns.

In a further embodiment, the present subject matter relates to a method of treating liver disease in a patient comprising administering to a patient in need thereof a therapeutically effective amount of the $^{99m}$Tc labeled CB7 encapsulated GA. In various embodiments, the cell viability of liver cells treated with the $^{99m}$Tc labeled CB7-GA complex are about 30% higher than a non-treated control group. In other embodiments, inflammation markers of liver cells treated with $^{99m}$Tc labeled CB7-GA complex are about 40% lower than the non-treated control group.

In still another embodiment, the present subject matter relates to a method of treating SARS COVID-2 in a patient comprising administering to a patient in need thereof a therapeutically effective amount of the $^{99m}$Tc labeled CB7-GA complex. In various embodiments, a viral load reduction of a patient treated with $^{99m}$Tc labeled CB7-GA complex is about 30% greater than a non-treated control patient. In other embodiments, viral protein expression inhibition of a patient treated with $^{99m}$Tc labeled CB7-GA complex is about 40% greater than a non-treated control patient. In still embodiments, cell viability of cells in a patient treated with $^{99m}$Tc labeled CB7-GA complex is about 40% greater than a non-treated control patient.

In one more embodiment, the present subject matter relates to a method of making the $^{99m}$Tc labeled CB7-GA complex, the method may include: mixing cucurbit[7]uril (CB7) and glycyrrhizic acid (GA) to obtain a CB7-GA complex; dissolving the CB7-GA complex in distilled saline to form a reaction mixture; adding a reducing agent to the reaction mixture to obtain a prepared the CB7-GA complex; labeling the prepared the CB7-GA complex by adding sodium pertechnetatet (Na99m TcO$_4$) to the prepared the CB7-GA complex; and obtaining the $^{99m}$Tc labeled CB7-GA complex.

In an embodiment of the present production methods, the CB7 and GA may be mixed in a 1:1 molar ratio.

In various embodiments, the sodium pertechnetate is a chemical form of technetium-99m ($^{99m}$Tc).

In another embodiment of the present production methods, the reducing agent may be stannous chloride (SnCl$_2$·2H$_2$O).

In a further embodiment of the present production methods, the concentration of SnCl$_2$·2H$_2$O may be 100 µg/100 µL.

In another embodiment of the present production methods, labeling of the prepared GA may be completed in ascorbic acid.

In a further embodiment of the present production methods, labeling of the prepared GA may completed at a pH of 7.

In another embodiment of the present production methods, the $^{99m}$Tc labeled CB7 encapsulated GA is obtained at a yield of 90%±1.0%.

The following examples relate to various methods of manufacturing the specific compounds and application of the same, as described herein. All compound numbers expressed herein are with reference to the synthetic pathway figures shown above.

EXAMPLES

Example 1

Preparation of $^{99m}$Tc Labeled CB7 Encapsulated GA

Figure 4:
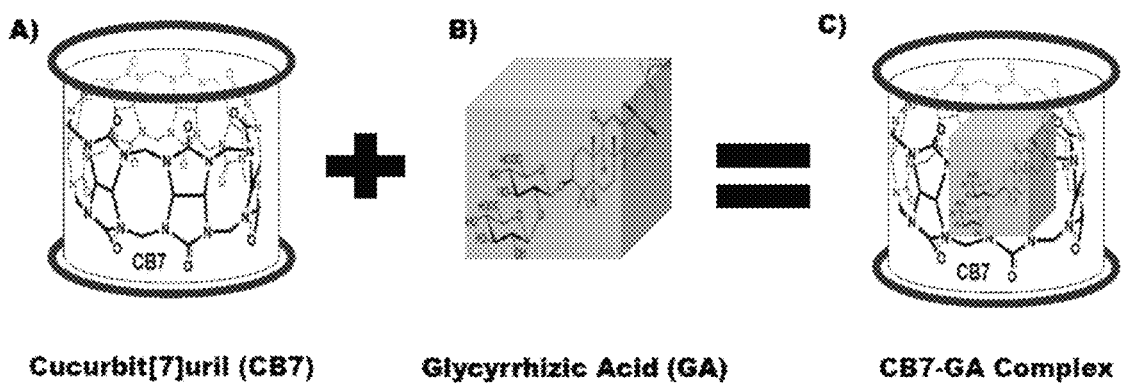
FIG. 4 shows a schematic of an implementation of a method of encapsulating GA with CB7.

As illustrated in FIG. 4, Cucurbit[7]uril(CB7) is mixed with glycyrrhizic acid solutions in a 1:1 molar ratio.

Example 2

Preparation of $^{99m}$Tc Labeled CB7 Encapsulated GA

Figure 5:
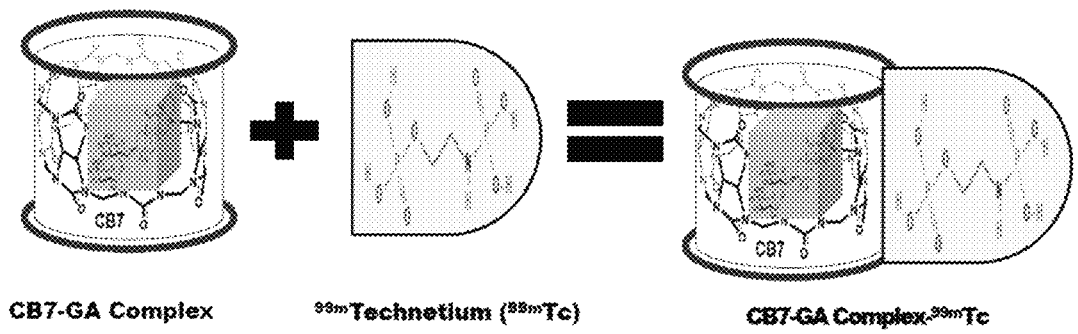
FIG. 5 shows a schematic of an implementation of a method of tagging a CB7-GA complex with $^{99m}$Tc.

An amount of 1 mg of glycyrrhizic acid (GA) was dissolved in 1 mL of distilled saline solution (0.9% NaCl) in a glass vial. Freshly prepared reducing agent such as stannous chloride (SnCl$_2$·2H$_2$O) solution (100 µg/100 µL) was added to the glass vial. An amount of 500 MBq (13.5 mCi) sodium pertechnetate (Na99mTcO$_4$), a chemical form of technetium-99m (99mTc) was added to the prepared GA. $^{99m}$Tc-GA was prepared. The labeling was carried out at different pH values by adjusting the pH of the solution using 0.1 N NaOH. The radiolabeling was completed in the presence of ascorbic acid (2 mg/ml). In FIG. 5, a schematic representation of the preparation is illustrated.

The sample was subjected to quality check using radio thin layer chromatography (RTLC). The RTLC used two solvent systems: 0.9% NaCl and acid citrate dextrose (ACD) solution as a developing mixture system. The RTLC chromatogram data determined the labeling yield and retention factor (Rf) value. The effects of pH (2, 5, 7, and 9), and stability of the reaction mixture over time were investigated. The optimum labeling yield of $^{99m}$Tc-GA over periods of 15, 30, 60, 120, and 180 minutes was determined.

At physiological pH 7.0, $^{99m}$Tc-GA had an optimal labeling yield of 90±1.0%. $^{99m}$Tc-GA remained stable for up to 3 hours.

Example 3

Biodistribution Activity

Experimental evaluation of the biodistribution of $^{99m}$Tc-GA was done in male Sprague Dawley (SD) rats. The brain, thyroid, heart, lung, liver, spleen, intestine, fat, muscle, bone, kidney, testes, bladder, prostate, and blood tissue's radioactivity were measured using a radioactivity counter (Dose calibrator, CA, USA) and a tube. The energy window was set to the $^{99m}$Tc's (140 keV) gamma-ray emission energy. The time between each organ sample counting was one minute. Consequently, none of the counts had a substantial decay factor. The percentage of the administered dose (ID) per gram for each tissue was calculated (% ID/g). FIG. 1 shows that the intestines scored the highest $^{99m}$Tc-GA uptake (***p<0.0001) among other organs. The liver showed a high uptake value, followed by the brain, kidney, and the heart. Blood and other organs showed the lowest uptake and % ID/g value. $^{99m}$Tc-GA showed time-dependent uptake.

Figure 6:
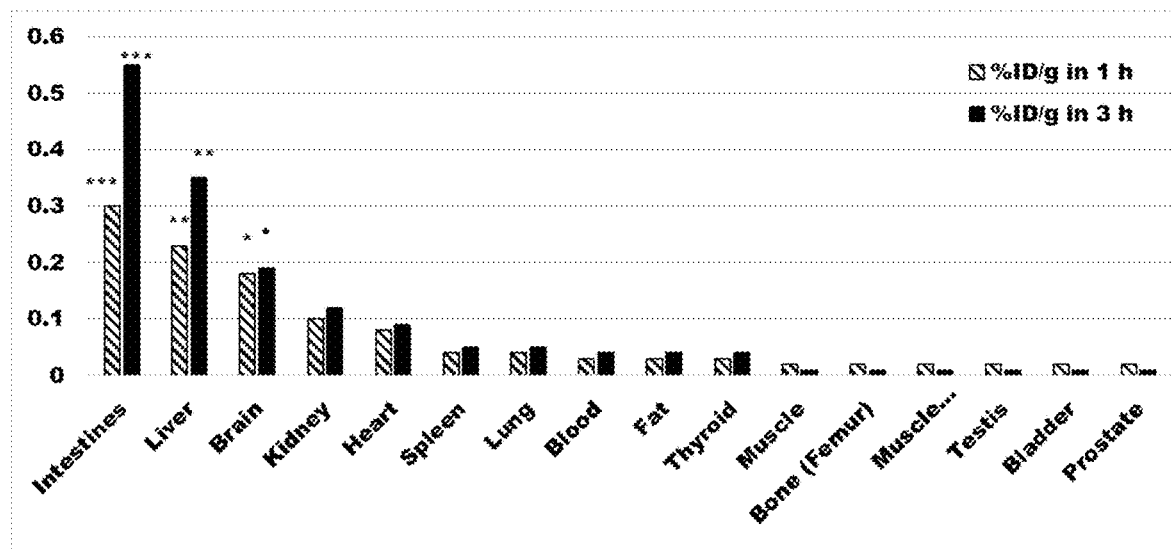
FIG. 6 is a graph showing $^{99m}$Tc-CB7-GA uptake by the organs of healthy rats.

FIG. 6 illustrates $^{99m}$Tc-GA uptake by the organs of healthy rats. $^{99m}$Tc-GA was administered intravenously. The animals were sacrificed. The animals' organs were isolated. The mass of each organ was weighed and the percent of the injected dose per gram tissue wet weight (% ID/g) was calculated. Results are expressed as mean±standard deviation (SD). Statistical analysis with t test, significance level *p<0.05, and p<0.001, *p<0.0001. The agar plate disc-diffusion method was applied. Sterilized filter papers (6 mm in diameter) were wetted with 10 µL of a solution of N'-(2-(5-phenyl-1,3,4-oxadiazol-2-ylthio)acetoxy)-2-naphthimidamide (3) to be tested, containing 10 mg/mL in DMSO, and the discs were allowed to air dry.

Example 4

Effect of CB7-Encapsulated Glycyrrhizic Acid Complex on Liver Cells (In vitro Data)

Figure 7:
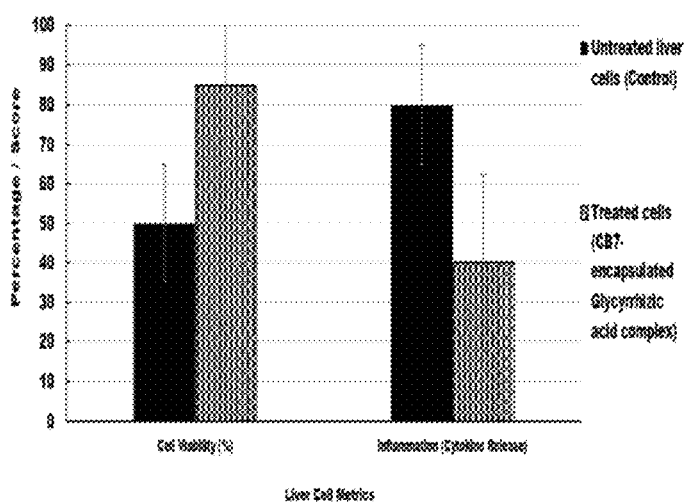
FIG. 7 shows a graph showing the effect of CB7-Encapsulated Glycyrrhizic Acid Complex on Liver Cells.

In FIG. 7, a graph comparing a control group (untreated liver cells) with the treated group of CB7-encapsulated glycyrrhizic acid complex in terms of various liver health metrics is illustrated. The pair of columns on the left illustrates cell viability. Cell viability is much higher in the group treated with the CB7 complex, indicating better liver cell health. The pair of columns on the right illustrates inflammation levels in the control group and with treated cells. Inflammation (cytokine release) markers are significantly lower in the treated group, suggesting anti-inflammatory and antioxidant effects.

Example 5

Simulation Data for Covid-19

Figure 8:
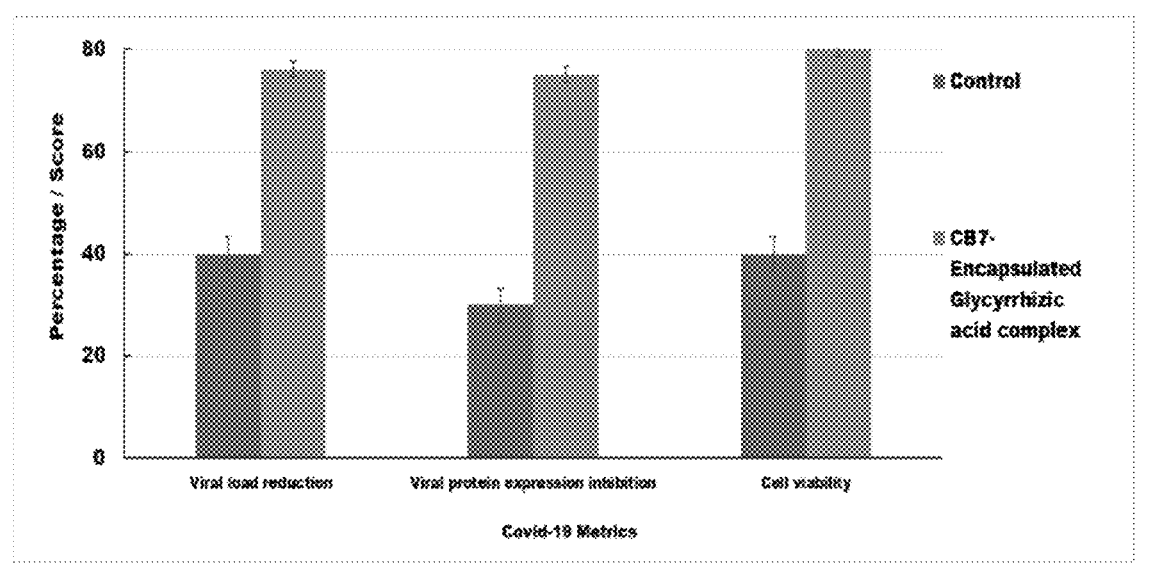

As illustrated in FIG. 8, simulation data predicts that the CB7-encapsulated glycyrrhizic acid (GA) complex has potential therapeutic benefits, with enhanced viral load reduction, viral protein expression inhibition, and cell viability.

It is to be understood that the $^{99m}$Tc labeled CB7 encapsulated GA radiopharmaceutical, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A radiopharmaceutical, comprising a $^{99m}$Tc labeled CB7-GA complex, the $^{99m}$Tc labeled CB7-GA complex consisting of:
    an encapsulated glycyrrhizic acid (GA) comprising GA encapsulated in a cavity of a cucurbit [7]uril macrocycle (CB7); and
    $^{99m}$Technetium ($^{99m}$Tc) tagged to the encapsulated GA.

2. The radiopharmaceutical of claim 1, wherein the GA is derived from a licorice plant.

3. The radiopharmaceutical of claim 1, wherein the $^{99m}$Tc labeled CB7-GA complex is stable for up to 3 hours.

4. A pharmaceutically acceptable composition comprising a therapeutically effective amount of the radiopharmaceutical of claim 1 and a pharmaceutically acceptable carrier.

5. A method of treating liver disease in a patient comprising administering to a patient in need thereof a therapeutically effective amount of the radiopharmaceutical of claim 1.

6. The method of treating liver disease of claim 5, wherein cell viability of liver cells treated with the $^{99m}$Tc labeled CB7-GA complex are about 30% higher than a non-treated control group.

7. The method of treating liver disease of claim 5, wherein inflammation markers of liver cells treated with the $^{99m}$Tc labeled CB7-GA complex are about 40% lower than the non-treated control group.

8. A method of treating viruses in a patient comprising administering to a patient in need thereof a therapeutically effective amount of the $^{99m}$Tc labeled CB7-GA complex of claim 1.

9. The method of treating viruses of claim 8, wherein the virus is Sars Covid-2.

10. The method of treating viruses of claim 8, wherein viral load reduction of the patient treated with the $^{99m}$Tc labeled CB7-GA complex is about 30% greater than a non-treated control patient.

11. The method of treating viruses of claim 8, wherein viral protein expression inhibition of the patient treated with the $^{99m}$Tc labeled CB7-GA complex is about 40% greater than a non-treated control patient.

12. The method of treating viruses of claim 8, wherein cell viability of cells in the patient treated with the $^{99m}$Tc labeled CB7-GA complex is about 40% greater than a non-treated control patient.

13. A method of making the radiopharmaceutical of claim 1, the method comprising:
    mixing cucurbit[7]uril (CB7) and glycyrrhizic acid (GA) to obtain a CB7-GA complex;
    dissolving the CB7-GA complex in distilled saline to form a reaction mixture;
    adding a reducing agent to the reaction mixture to obtain a prepared CB7-GA complex;
    labeling the prepared CB7-GA complex by adding Na$^{99m}$TcO$_4$ to the prepared CB7-GA complex; and
    obtaining the $^{99m}$Tc labeled CB7-GA complex of claim 1.

14. The method of making the radiopharmaceutical of claim 13, wherein the CB7 and GA are mixed in a 1:1 molar ratio.

15. The method of making the radiopharmaceutical of claim 13, wherein the reducing agent is SnCl$_2$·2H$_2$O.

16. The method of making the radiopharmaceutical of claim 15, wherein the concentration of SnCl$_2$·H$_2$O is 100 µg/100 µL.

17. The method of making the radiopharmaceutical of claim 13, wherein labeling of the prepared CB7-GA complex is completed in the presence ascorbic acid.

18. The method of making the radiopharmaceutical of claim 13, wherein the labeling of the prepared CB7-GA complex is completed at a pH of 7.

19. The method of making the radiopharmaceutical of claim 13, wherein the 99$^m$Tc labeled CB7-GA complex is obtained at a yield of 90%±1.0%.

* * * * *